Figure 1:
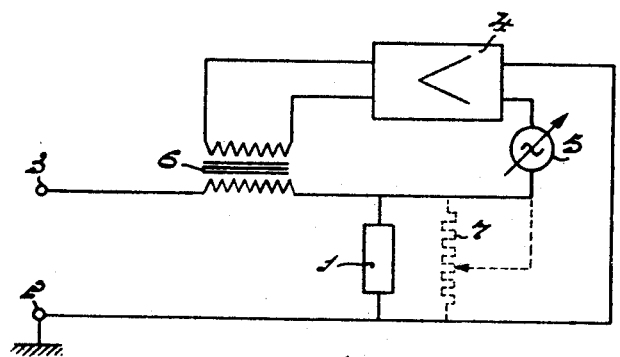

Patented Oct. 2, 1951

2,570,015

UNITED STATES PATENT OFFICE 2,570,015

CONTROL DEVICE

Carel Jan van Loon and Willem Beukema, Eindhoven, Netherlands, assignors to Hartford National Bank and Trust Company, Hartford, Conn., as trustee Application July 20, 1946, Serial No. 685,150
In the Netherlands May 22, 1943

Section 1, Public Law 690, August 8, 1946
Patent expires May 22, 1963

5 Claims. (Cl. 171—119)

This invention relates to the controlling, for instance keeping constant, of the amplitude of an alternating feed voltage or alternating feed current of a load.

For keeping constant an alternating feed voltage devices are known, in which use is made of a transformer having tappings and the active tapping, upon variations of the feed voltage, is varied by means of relays fed with the voltage set up at the load, in such a manner that the voltage variations appearing at the load are kept within definite limits.

Of course, the control sensitiveness and control speed of such devices is very limited.

These drawbacks are avoided by voltage regulators comprising saturated transformers, but these regulators often involve undesired distortion and a frequency dependency of the load voltage.

The present invention has for its object a control device by means of which all of the said drawbacks can be avoided.

According to the present invention, for controlling the alternating feed voltage or alternating feed current of a load, a control voltage, which is obtained by amplifying the potential difference between a voltage proportional to a magnitude to be controlled and a comparison voltage whose frequency corresponds to that of the feed voltage, is connected in series therewith in such a manner that the said potential difference becomes smaller.

The device according to the invention yields effect, since the power to be given off by the comparison supply is nil, so that the keeping constant thereof or variation thereof in a definite manner, for instance in accordance with the voltage of the load supply, does not involve great difficulties.

In the device according to the invention the load current or load voltage steadily follows the comparison voltage and this not only occurs in regard to its value but also in regard to its form and even its phase, provided that the phase difference between the non-controlled voltage and the comparison voltage be small.

Conformity as regards the form of the comparison voltage and the load current or load voltage permits distortions due to higher harmonics, which are inherent to the supply e. g. the power mains, and are to be avoided as far as possible. At the same time disturbances of a different nature are attenuated, if only the frequency of these disturbances lies within the frequency range passed on by the used amplifier.

The control sensitiveness of the device according to the invention and the attenuation of disturbances increases with the amplification factor of the amplifier used for amplification of the potential difference between the comparison voltage and the magnitude to be controlled.

In order that the invention may be clearly understood and readily carried into effect it will now be described more fully with reference to the accompanying drawing, given by way of example.

Figure 2:
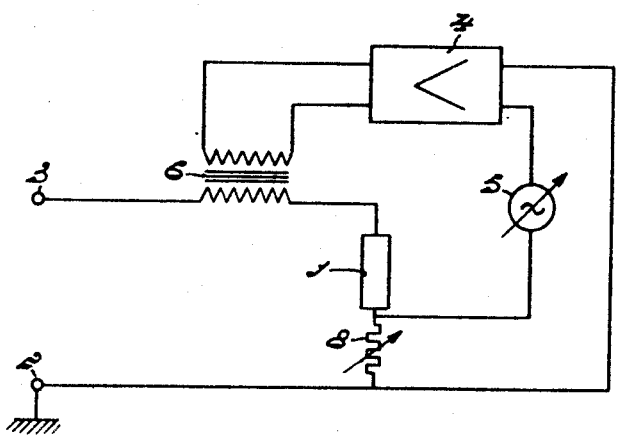

Fig. 1 represents a device for controlling the voltage set up at the load, Fig. 2 representing diagrammatically a device for controlling the current traversing a load.

Fig. 1 represents a power load 1 which is to be fed from a power network to be connected to the junction terminals 2, 3 with an alternating voltage which is independent of the mains voltage variations. To this end there is provided an electron-discharge tube amplifier 4 of a type well-known in amplification technique, which is controlled by the potential difference between the voltage prevailing at the load 1 and a comparison voltage taken from the supply source 5, which comparison voltage is in phase opposition to the load voltage and has an amplitude and form as is required for the load voltage. After amplification by means of a transformer 6 inserted in the output circuit of the amplifier 4 this difference voltage is introduced into one of the connecting leads between the mains and the load in such a manner that the said difference voltage becomes smaller. The voltage set up at the load will now conform to the comparison voltage in regard to amplitude and phase.

The required comparison voltage may be generated in various ways. Thus, for instance, it may be taken from an electron discharge-tube generator fed from the mains and synchronised with the mains voltage. These means which are known as being used for avoiding amplitude variations. At the same time it is possible, for instance, to obtain the comparison voltage by conversion of a constant direct voltage by means of a mechanically vibrating converter excited by the mains voltage, higher harmonics of the comparison voltage being eliminated by filters.

The load voltage can be adjusted to a definite desired value by adjustment of the amplitude of the comparison voltage, as indicated in the drawing by an arrow at 5. As an alternative the load voltage may be made to vary in accordance with an arbitratory magnitude, for instance the mains voltage itself, according to definite lines by taking care that the comparison voltage varies accordingly, which may be desirable for testing purposes or, for instance, temperature control or the like.

The amplitude of the comparison voltage need not correspond with that of the load voltage but may be much smaller when making use of the circuit arrangement indicated in dotted lines in Fig. 1, in which a fraction determined by the attenuation factor of a potentiometer 7 connected in parallel with the load is supplied in series with the comparison voltage to the amplification circuit. This arrangement is often advantageous in conjunction with the production of the comparison voltage. The control sensitiveness decreases in accordance with the attenuation factor of the potentiometer used, it is true, but this can be provided for in a simple and cheap manner by a corresponding increase of the used amplification factor. By making the attenuation factor adjustable the load voltage can also be controlled in a simple manner.

The power to be given off by the amplifier corresponds to the difference in the power taken up by the load upon feeding with the desired voltage and the non-controlled voltage. Consequently, if the mains voltage variations to be expected amount to about 5% the amplifier should be proportioned for an output power of 10% of the power taken up by the load at the voltage prescribed.

In conjunction therewith it is more advantageous with larger loads, from the point of view of efficiency and installation cost, notably when the mains voltage variations to be expected are large, to use the represented device in combination with a preconnected regulating device of a different kind, for instance of the type referred to in the preamble. The latter yields a coarse and slow control in comparison with the device represented in Fig. 1, but this is not objectionable since with power mains the large variations normally take place slowly and only the small variations take place rapidly. These rapid, small variations and, as the case may be, other distortions caused by the other control device, are then compensated by means of the control voltage taken from the amplifier; in this case the output power of the amplifier may be chosen comparatively small.

When feeding the load from a supply having a grounded connecting terminal, for instance 2, it is desirable that the control voltage should be operative in the ungrounded junction lead between the mains and the load, since in this case the load and, moreover, one of the amplification input terminals can be grounded.

The load current may be controlled similarly to the load voltage. In this case the voltage proportionate to the magnitude to be controlled is taken from a resistance 8 connected in series with the load, as shown in Fig. 2.

What we claim is:

1. Apparatus for controlling the feed voltage of a load connected to a mains source of power, comprising means to generate a reference voltage, means to produce a second voltage proportional to the voltage across said load, means to add said reference voltage and said second voltage in phase opposition to produce a difference voltage, means coupled to said adding means to generate electrical power proportional to the value of said difference voltage, and means to couple the said generated power to the mains power applied to said load to diminish said difference voltage.

2. Apparatus for controlling the feed voltage of a load connected to an alternating current mains source of power, comprising means to generate a reference alternating voltage in synchronism with the voltage of said mains power, potentiometer means connected across said load to produce a second voltage proportional to the voltage across said load, means to add said reference voltage and said second voltage in phase opposition to produce a difference voltage, electron-discharge tube amplifier means coupled to said adding means to generate power proportional to the value of said difference voltage and means to add the said generated power to the mains power applied to said load in a phase to diminish said difference voltage.

3. Apparatus for controlling the feed voltage of a load connected to an alternating current mains source of power, comprising means to generate a reference voltage in synchronism with the voltage of said mains power, means coupled to the said load to produce a second voltage proportional to the voltage across said load, means to add said reference voltage and said voltage in phase opposition to produce a difference voltage, electron discharge tube amplifier means coupled to said adding means to generate power proportional to the value of said difference voltage, and transformer means having a primary winding connected to the output circuit of the said amplifying means and a secondary winding connected in series with the load to add said generated power to the mains power applied to said load in a phase to diminish said difference voltage.

4. Apparatus for controlling the feed voltage of a load connected to an alternating current mains source of supply having a grounded supply line and an ungrounded supply line, comprising means to generate a reference voltage in synchronism with the voltage of said mains power, means to produce a second voltage proportional to the voltage across said load, means to add said reference voltage and said second voltage in phase opposition to produce a difference voltage, electron discharge tube amplifier means coupled to said adding means to generate power proportional to the value of the said difference voltage, and means to add the said generated power in series with said ungrounded supply line applied to said load in a phase to diminish said difference voltage.

5. Apparatus for controlling the feed voltage of a load connected to an alternating current mains source of supply, comprising means to generate a reference voltage in synchronism with the voltage of said mains power, means to produce a second voltage proportional to the voltage across said load, means to add said reference voltage and said second voltage in phase opposition to produce a difference voltage, electron discharge tube amplifier means coupled to said adding means to generate power proportional to the value of the said difference voltage, means to add the said generated power to the mains power applied to said load in a phase to diminish said difference voltage, and means to vary the power applied to said load comprising means to vary the amplitude of the said reference voltage.

CAREL JAN van LOON.
WILLEM BEUKEMA.

REFERENCES CITED

The following references are of record in the file of this patent:

UNITED STATES PATENTS

| Number | Name | Date |
| --- | --- | --- |
| 1,620,619 | Currier | Mar. 8, 1927 |
| 1,992,146 | Craig | Feb. 19, 1935 |
| 1,997,657 | Schmutz | Apr. 16, 1935 |
| 2,129,890 | Trucksess | Sept. 13, 1938 |
| 2,324,822 | Champlin | July 20, 1943 |